(12) United States Patent
Kim et al.

(10) Patent No.: US 7,933,603 B2
(45) Date of Patent: Apr. 26, 2011

(54) METHOD AND APPARATUS FOR EXECUTING SCANNING AT A MOBILE STATION FOR BROADBAND WIRELESS ACCESS SYSTEM

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/365,115

(22) Filed: Feb. 3, 2009

(65) Prior Publication Data

US 2009/0201882 A1    Aug. 13, 2009

Related U.S. Application Data

(63) Continuation of application No. 11/389,608, filed on Mar. 24, 2006, now Pat. No. 7,558,544.

(30) Foreign Application Priority Data

| Mar. 24, 2005 | (KR) | 10-2005-0024695 |
| Sep. 3, 2005 | (KR) | 10-2005-0081987 |
| Mar. 3, 2006 | (KR) | 10-2006-0020225 |

(51) Int. Cl.
*G06F 15/16* (2006.01)
(52) U.S. Cl. ........... 455/437; 455/132; 455/343.2; 455/343.4; 455/434; 455/438; 370/328; 370/331
(58) Field of Classification Search .......... 455/132, 455/343.2, 343.4, 432, 434, 513, 437; 370/331, 370/328
See application file for complete search history.

(56) References Cited

U.S. PATENT DOCUMENTS

| 5,375,167 | A | 12/1994 | Bales et al. |
| 5,377,262 | A | 12/1994 | Bales et al. |
| 5,386,466 | A | 1/1995 | Bales et al. |
| 5,390,242 | A | 2/1995 | Bales et al. |
| 5,416,834 | A | 5/1995 | Bales et al. |
| 5,734,795 | A | 3/1998 | Rogers |
| 5,870,588 | A | 2/1999 | Rompaey et al. |
| 6,118,858 | A | 9/2000 | Kang et al. |
| 6,308,066 | B1 | 10/2001 | Ranta et al. |
| 6,542,490 | B1 | 4/2003 | Ahmadvand et al. |

(Continued)

FOREIGN PATENT DOCUMENTS

JP    2005-101788    4/2005

(Continued)

OTHER PUBLICATIONS

IEEE Standards Committee, "Part 16: Air Interface for Fixed Broadband Wireless Access Systems," 802.16 IEEE Standard for Local and Metropolitan Area Networks, Oct. 2004.

(Continued)

*Primary Examiner* — William D Cumming
(74) *Attorney, Agent, or Firm* — Lee, Hong, Degerman, Kang & Waimey

(57) ABSTRACT

The primitives between an upper management layer and the MAC layer within a mobile station and a base station are defined in order to specify and clarify the operations within the protocol stack layers in a broadband wireless access system to allow a mobile station to perform scanning procedures. Media Independent Handover (MIH) procedures can be achieved because the NCMS and MIH layer can communicate through use of these primitives.

10 Claims, 6 Drawing Sheets

U.S. PATENT DOCUMENTS

| | | | |
|---|---|---|---|
| 6,542,741 B2 | 4/2003 | Wallstedt et al. | |
| 6,567,425 B1 | 5/2003 | Szabo et al. | |
| 6,714,589 B1 | 3/2004 | Cole | |
| 7,167,181 B2 | 1/2007 | Duluk et al. | |
| 7,299,220 B2 | 11/2007 | Chaudhuri et al. | |
| 7,558,544 B2 * | 7/2009 | Kim et al. | 455/132 |
| 7,606,200 B2 * | 10/2009 | Kwak et al. | 370/331 |
| 7,630,702 B2 * | 12/2009 | Kim et al. | 455/343.4 |
| 7,664,480 B2 * | 2/2010 | Kim et al. | 455/343.2 |
| 2005/0043050 A1 | 2/2005 | Lee et al. | |
| 2005/0059437 A1 | 3/2005 | Son et al. | |
| 2005/0128990 A1 | 6/2005 | Eom et al. | |
| 2006/0084453 A1 | 4/2006 | Kim et al. | |
| 2006/0233198 A1 | 10/2006 | Kim et al. | |
| 2006/0234742 A1 * | 10/2006 | Kim et al. | 455/513 |
| 2006/0240799 A1 * | 10/2006 | Kim et al. | 455/343.2 |
| 2006/0240832 A1 * | 10/2006 | Kim et al. | 455/438 |
| 2006/0251100 A1 * | 11/2006 | Kim et al. | 370/432 |
| 2006/0281436 A1 | 12/2006 | Kim et al. | |
| 2007/0183383 A1 | 8/2007 | Bitran et al. | |
| 2007/0184798 A1 | 8/2007 | Bitran et al. | |
| 2007/0184835 A1 | 8/2007 | Bitran et al. | |
| 2009/0137248 A1 * | 5/2009 | Kim et al. | 455/434 |
| 2009/0196228 A1 * | 8/2009 | Kim et al. | 370/328 |
| 2009/0201882 A1 * | 8/2009 | Kim et al. | 370/331 |

FOREIGN PATENT DOCUMENTS

| | | |
|---|---|---|
| JP | 2007-535205 | 11/2007 |
| WO | 2005/025092 | 3/2005 |

OTHER PUBLICATIONS

IEEE, "Part 16: Air Interface for Fixed Broadband Wireless Access Systems," 802.16 IEEE Standard for Local and Metropolitan Area Networks, Oct. 2004.

* cited by examiner

METHOD AND APPARATUS FOR EXECUTING SCANNING AT A MOBILE STATION FOR BROADBAND WIRELESS ACCESS SYSTEM

CROSS REFERENCE TO RELATED APPLICATION

This application is a continuation of U.S. application Ser. No. 11/389,608 filed Mar. 24, 2006 now U.S. Pat. No. 7,558,544 which, pursuant to 35 U.S.C. § 119, claims the benefit of earlier filing date and right of priority to Korea Application No. 10-2005-24695, filed Mar. 24, 2005, Korean Application No. 10-2005-81987, filed Sep. 3, 2005, and Korean Application No. 10-2006-20225, filed Mar. 3, 2006, the contents of which are hereby incorporated by reference herein in their entirety.

FIELD OF THE INVENTION

The present invention relates to a broadband wireless access system, and more particularly, to a method of clearly defining the primitives used for the protocol stack within the mobile station and the protocol stack within the base station, in order to support a scanning operation performed by the mobile station in order to verify the channel quality of neighboring base stations.

BACKGROUND ART

The system of the IEEE 802.16e that is undergoing international standardization with respect to broadband wireless access systems, does not have a layered architecture comprised of a HLR (Home Location Register), a VLR (Visitor Location Register), a MSC (Mobile Switching Center), a BSC (Base Station Controller), a RNC (Radio Network Controller), and the like, as in the existing 2G and 3G mobile communication systems, but instead, is comprised of only a MSS (Mobile Subscriber Station), a BS (Base Station) and a ASA (Authentication Service Authorization).

The broadband wireless access system defines the protocols of the MAC (Medium Access Control) layer and the PHY (PHYsical) layer that are common between the base station and the mobile station (MSS). FIG. 1 depicts an exemplary protocol layer architecture for a broadband wireless access system.

FIG. 2 depicts the procedures for searching and broadcasting neighbor base station information in a broadband wireless access system according to the related art.

If the mobile station (MSS) receives a neighbor base station information broadcast message (MOB_NBR-ADV) from a serving base station [S21], the mobile station temporarily stops data reception from the serving base station and transmits a scan request message (MOB_SCN-REQ) in order to obtain a certain amount of time (duration=N frames) for performing channel quality measurements of neighbor base stations [S22]. While the mobile station measures the channel quality of neighbor base stations, the serving base station stops any data transmission to the mobile station, but stores such data that be may be transmitted after the scanning (searching) duration requested by the mobile station has been completed. The MOB_NBR-ADV is a message that is broadcast by the serving base station to the mobile station in order to provide information related to neighbor base stations, and may contain the total number of neighbor base stations, identifiers for the neighbor base stations, frequencies used by the neighbor base stations, channel information of the neighbor base stations, and the like.

In response to the scan request message (MOB_SCN-REQ) sent from the mobile station, the serving base station transmits a scan response message (MOB_SCN-RSP) [S23]. In FIG. 2, the serving base station is guaranteed a time duration from the Mth frame until the Nth frame to perform channel quality measurements for the neighbor base stations. In other words, the scanning (searching) duration requested by the mobile station is guaranteed by the scan request message and the scan response message between the mobile station and the serving base station, and the mobile station and serving base station agree that the guaranteed duration should begin after the Mth frame. The mobile station then measures the channel quality of neighbor base stations during the guaranteed scanning duration [S24, S25]. The mobile station provides the scanning results to the serving base station by transmitting a scanning result report message (MOB_SCAN-REPORT) [S26].

As explained above, in the related art, the messages used by the mobile station to perform scanning that are transmitted and received with the base station are defined, but the operations actually related to scanning are not defined for the protocol stack (layers) within the mobile station and the protocol stack (layers) within the base station. Namely, there are no definitions for the primitives with respect to information transferred between the MAC layer and upper management entity via the NCMS (Network Control Management System), within the protocol stacks of the mobile station and the base station, respectively.

SUMMARY

One aspect of the present invention involves the recognition by the present inventors of the drawbacks in the related art as explained above. In order to address such problems, the present invention provides a method of defining the primitives between an upper management layer and the MAC layer in order to specify and clarify the operations within the protocol stack layers in a broadband wireless access system to allow a mobile station to perform scanning procedures.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

DETAILED DESCRIPTION

The present invention is described as being implemented in a broadband wireless access system, such as a 802.16e network. However, the present invention may also be adapted and implemented in communication systems operating under other types of communication specifications (e.g., 802.16g, 802.21, 802.11u, etc.), because the concepts and teachings of the present invention could be applied to various communication schemes that operate in a similar manner based upon common techniques. Non-limiting exemplary embodiments of the present invention are explained below with reference to the attached Figures.

Also, certain aspects of the present invention will be described with respect to particular names for the entities, interfaces, primitives, messages, etc., but those skilled in the art will clearly understand that such names are non-limiting, as other names (label, terms, etc.) may also be used as long as their functions correspond with those taught by the present invention.

The present invention provides a method that allows an entity that performed management or control of a system (mobile station or base station) to manage the MAC layer and the PHY layer by transferring primitives from a MAC layer, through a NCMS (Network Control Management System), to the necessary upper management entity. In particular, when the mobile station performs scanning, a method of defining the primitives that need to be transferred between the MAC layer and the upper management entity via the NCMS in the protocol stacks within the mobile station and the base station is provided.

Hereafter, the management entity refers to all entities that interface with the NCMS, and can be any logical management entity or physical management entity that exists in the IP layer or its upper layer within a device. The operation of the present invention may look as if the NCMS directly sends (delivers) the primitives, because communication is performed from the upper management entity, via the NCMS, to the Management SAP (M-SAP) or Control SAP (C-SAP).

Figure 1:
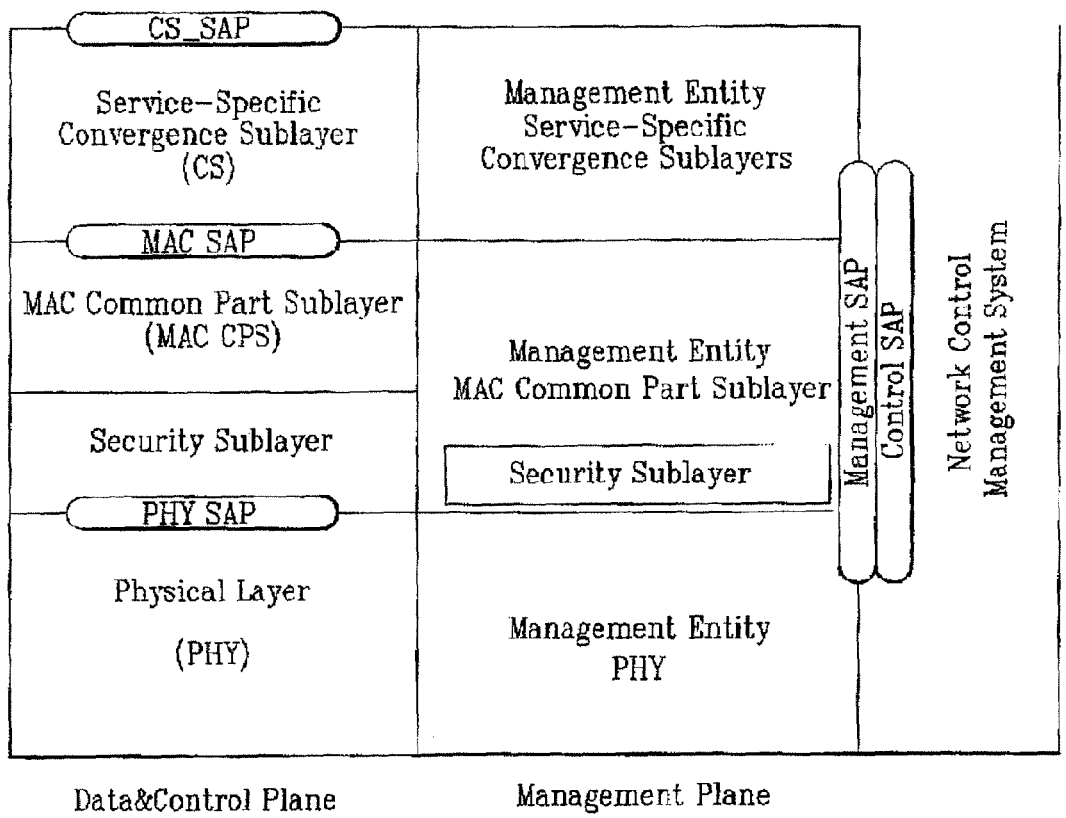
FIG. 1 depicts an exemplary protocol layer architecture for a broadband wireless access system.
Figure 2:
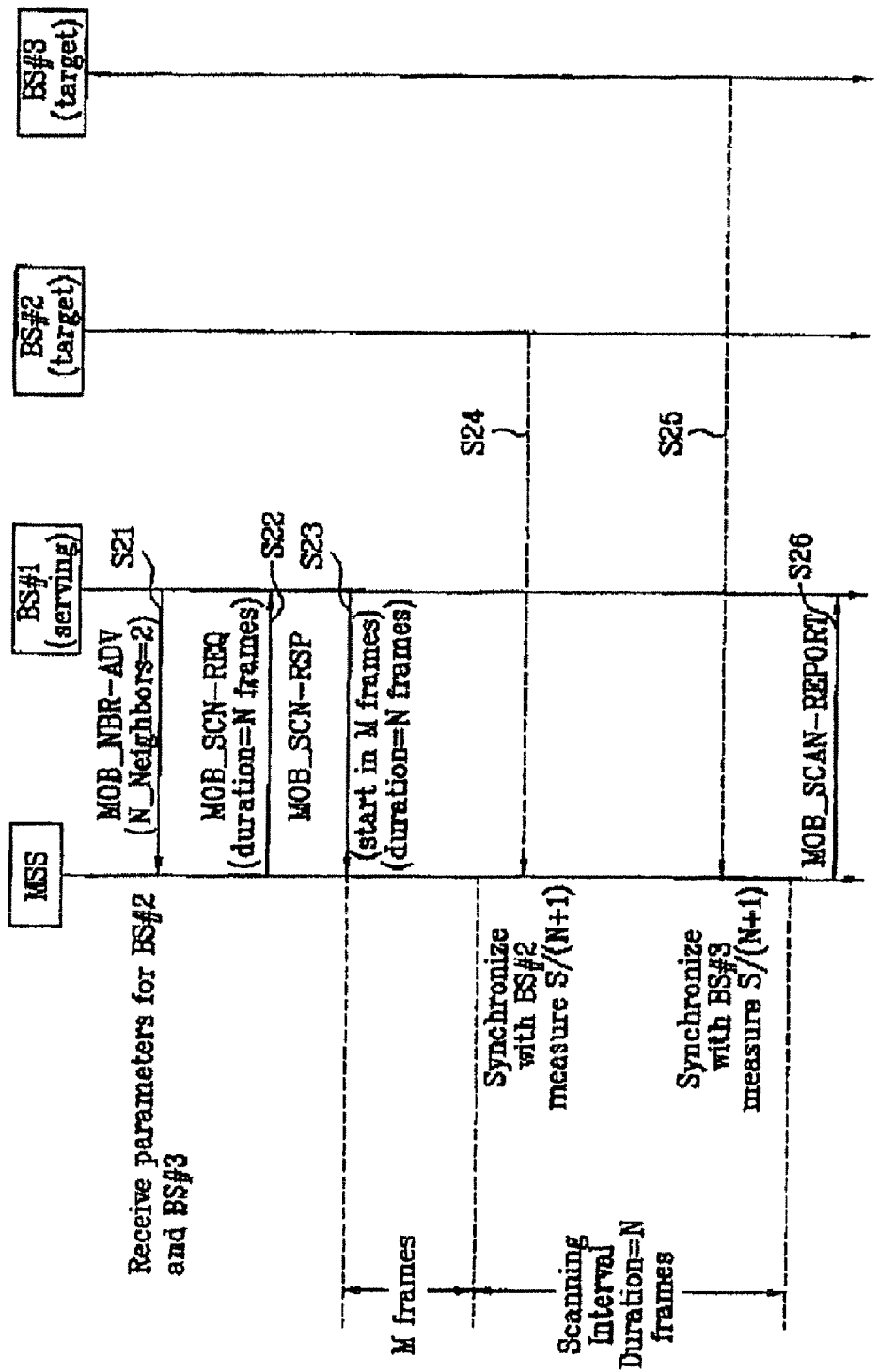
FIG. 2 depicts the procedures for searching and broadcasting neighbor base station information in a broadband wireless access system according to the related art.

The upper management entity used in the present invention can be located above a layer management entity within a protocol stack as shown in FIG. 1, and be divided into a physical or logical upper management entity that communicates through the NCMS or management SAP of a layer management entity. The upper management entity may exist within a particular protocol stack or may exist as a separate and independent system or stack, but will be conceptually referred to as an upper management entity.

Figure 3:
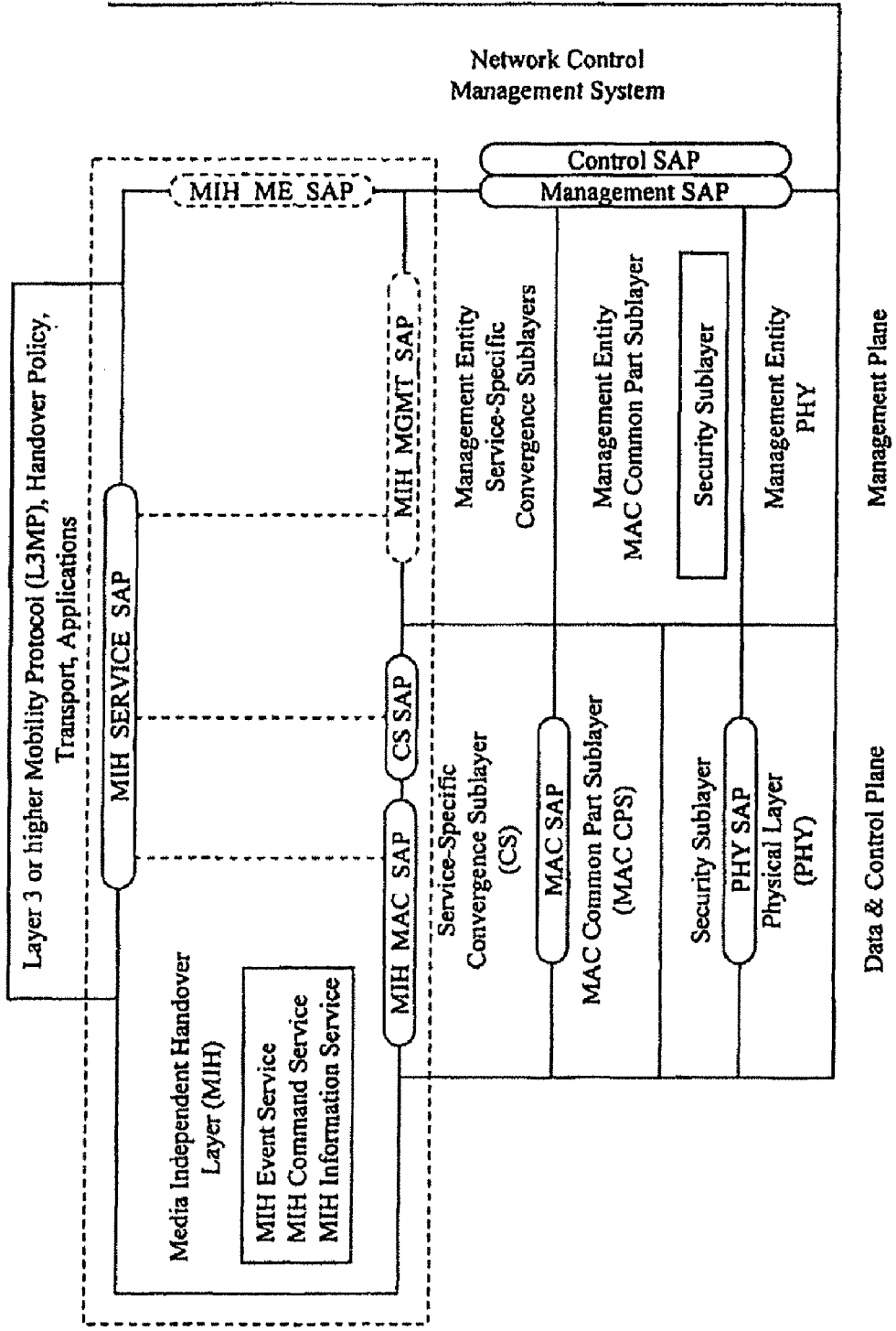
FIG. 3 depicts an exemplary protocol architecture model that considers Media Independent Handover (MIH).

FIG. 3 depicts an exemplary protocol architecture model that considers Media Independent Handover (MIH).

The primitives provided by the present invention are delivered (transferred) to the NCMS (Network Control & Management System) via a Management SAP (M-SAP) or a Control SAP (C-SAP), and the NCMS can deliver (transfer) the primitives to the necessary locations including the upper management entities.

The M-SAP can have the functions for performing system configuration, for monitoring statistics, for notifications/triggers, etc., but are not limited to only these functions. The C-SAP can have the functions for performing handovers (e.g., notification of HO request from MS, etc.), for idle mode mobility management (e.g., mobile entering idle mode), for subscriber and session management (e.g., mobile requesting session setup), for radio resource management, etc., but are not limited to only these functions. Although the primitives of the present invention may be distinguished according to their functions above, such primitives can be delivered through the M-SAP and/or C-SAP.

Figure 4:
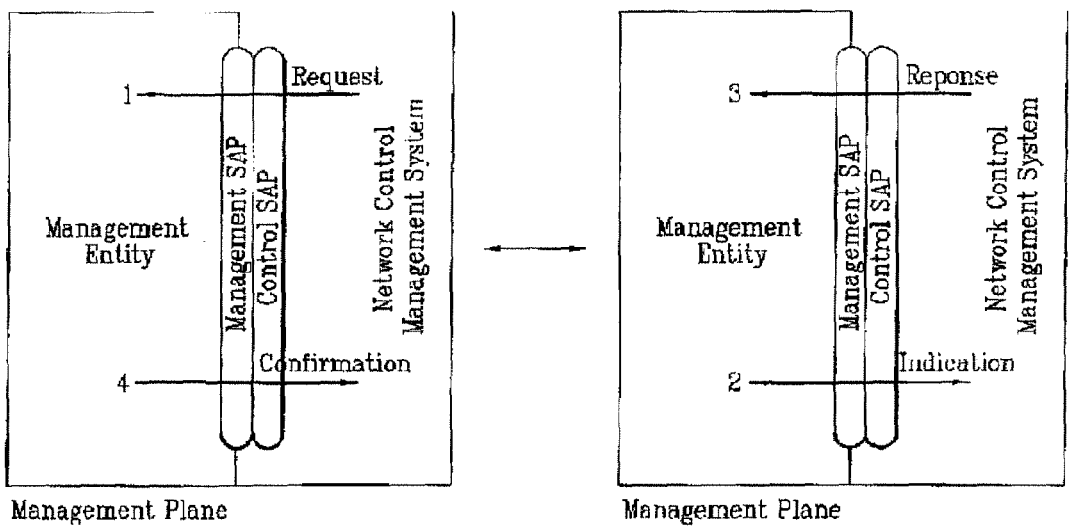
FIGS. 4 and 5 depict the principles of how the primitives operate according to the present invention.
Figure 5:
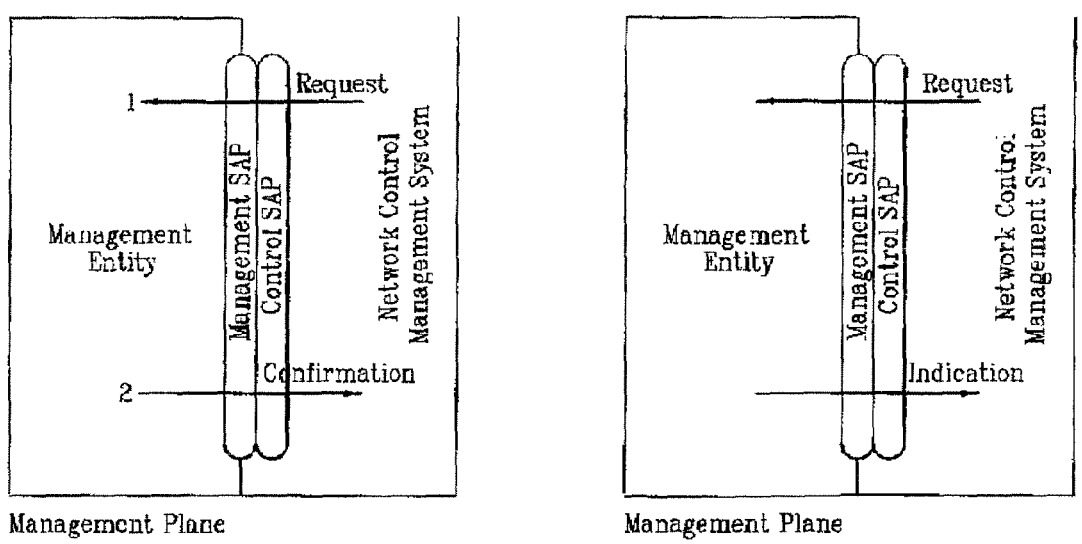

FIGS. 4 and 5 depict the principles of how the primitives operate according to the present invention. Primitives that require cooperation with a remote entity are shown in FIG. 4, while primitives that are only delivered within a local stack are shown in FIG. 5.

As shown in FIG. 4, when there is cooperation with a remote entity, a pair of operations comprising a Request-and-Confirmation or comprising a Response-and-Indication are performed.

As shown in FIG. 5, when operations occur within a local stack, there may be two situations: mutual exchanges between the management entity and the NCMS (i.e., a bi-directional operation) or a uni-directional operation. For bi-directional operation, the delivery from the management entity through the M-SAP/C-SAP to the NCMS is called a Request, and its response that is transmitted is called an Indication. For uni-directional operation, the delivery from the management entity through the M-SAP/C-SAP to the NCMS is called a Request, and a uni-directional delivery in the opposite direction is called an Indication.

The primitives according to the present invention may be used for a multi-mode mobile station in which a management entity instructs a corresponding mode or when the corresponding mode delivers information to the entity that manages all the multi-modes. In such case, the following two situations can exist.

First, when the primitives are delivered from the MIH layer or MIH function to a lower layer, the MIH (layer or function) may interpret the information (e.g., commands, etc.) received from an upper layer when delivering the corresponding primitive or the upper layer information (command) may be mapped with the commands of the present invention and transmitted.

Second, when the primitives are delivered from the lower layer to the MIH layer or MIH function, the MIH (layer or function) may interpret the primitive received from the lower layer when transmitting the corresponding primitive (i.e., a unified primitive defined at the MIH) to be delivered to the upper layer or the primitive of the lower layer and the primitive to be sent to the upper layer may be simply mapped and then transmitted.

When used in Media Independent Handover (MIH), the primitives defined by the present invention may be delivered through the SAP between the NCMS and the MIH or the SAP between the management entity and the MIH such that MIH techniques can be achieved.

A method of executing scanning in a broadband wireless access system comprises: receiving, by a MAC layer of a mobile station, a neighbor base station information broadcast message (MOB_NBR-ADV) transmitted from a base station; delivering by the MAC layer, to an upper management entity through a first primitive, the information included in the neighbor base station information broadcast message; delivering, from the upper management entity, a second primitive indicating scanning should be performed at the MAC layer; performing scanning at the MAC layer with respect to neighbor case stations; and delivering by the MAC layer, to the upper management layer through a third primitive, a result of the scanning.

To allow the mobile station to perform scanning by using the MAC messages transmitted and received with the base station and the primitives provided by the present invention, the embodiments that explain the operation performed between the upper management entity and the MAC layer via the NCMS within the mobile station and the base station, will be described with reference to FIGS. 6 and 7.

Figure 6:
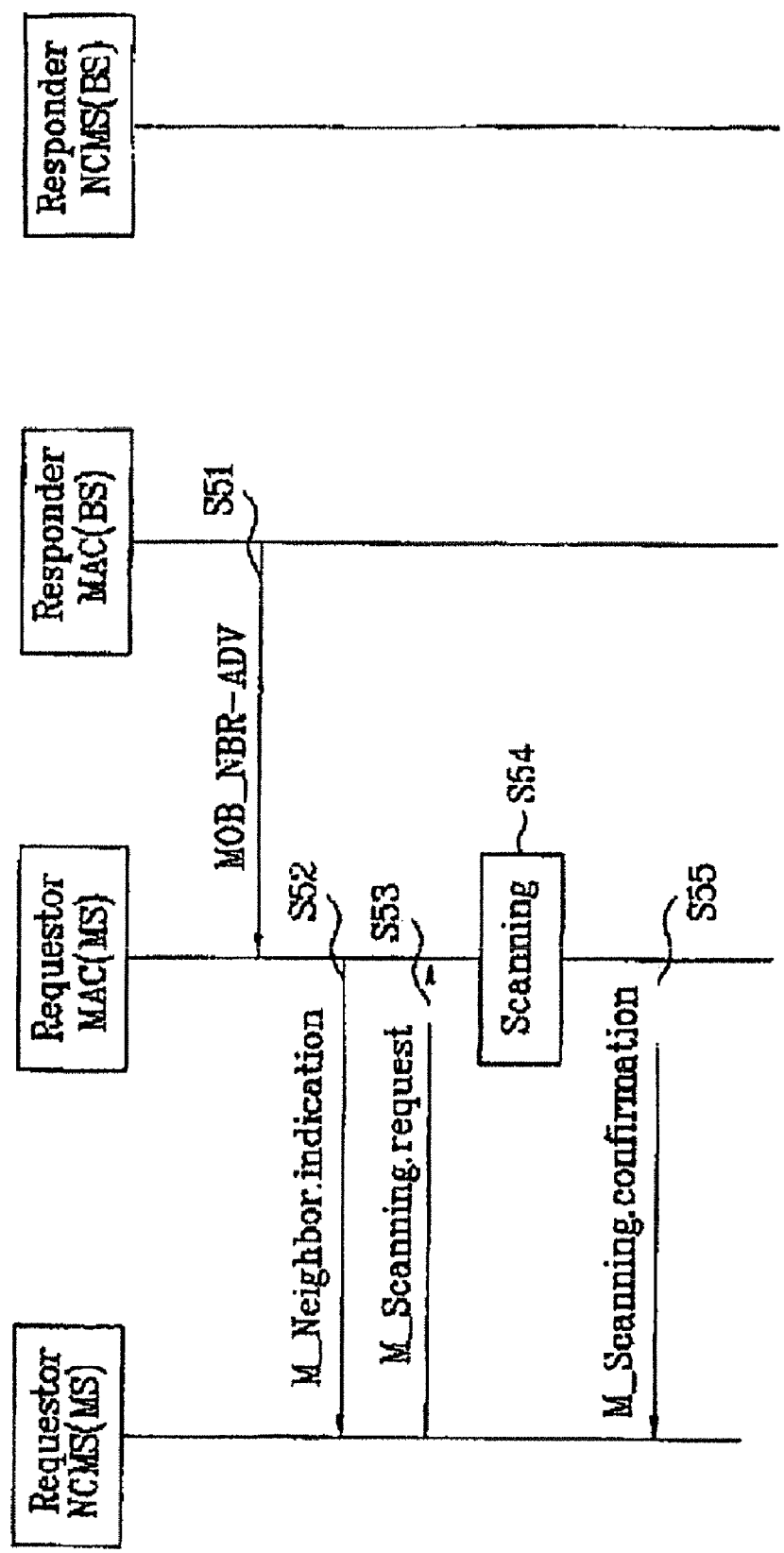
FIG. 6 depicts a flow chart of an exemplary embodiment of the present invention.

FIG. 6 depicts a flow chart of an exemplary embodiment of the present invention, wherein the mobile station performs scanning without providing a scan request to the base station.

Even without neighbor case station information being transmitted from a base station, the mobile station may request scanning and the mobile station can itself perform scanning.

The MAC layer of the mobile station receives a MOB_NBR-ADV message from the base station [S51], and the information included in the message can be delivered to its upper management entity through an M_Neighbor-indication primitive [S52]. The MOB_NBR-ADV is message that is broadcast by a base station to the mobile station for providing information of neighbor base stations, and the MOB_NBR-ADV message contains the total number of base stations, identifiers for neighbor base stations, frequencies used by neighbor case stations, channel information of neighbor base stations, and the like.

The NCMS entity of the mobile station delivers to the MAC layer of the mobile station, an M_scanning.request that instructs scanning to be performed [S53]. After the MAC layer of the mobile station performs scanning [S54], the results thereof are delivered to the upper management entity through use of an M_Scanning.confirmation primitive [S55].

Figure 7:
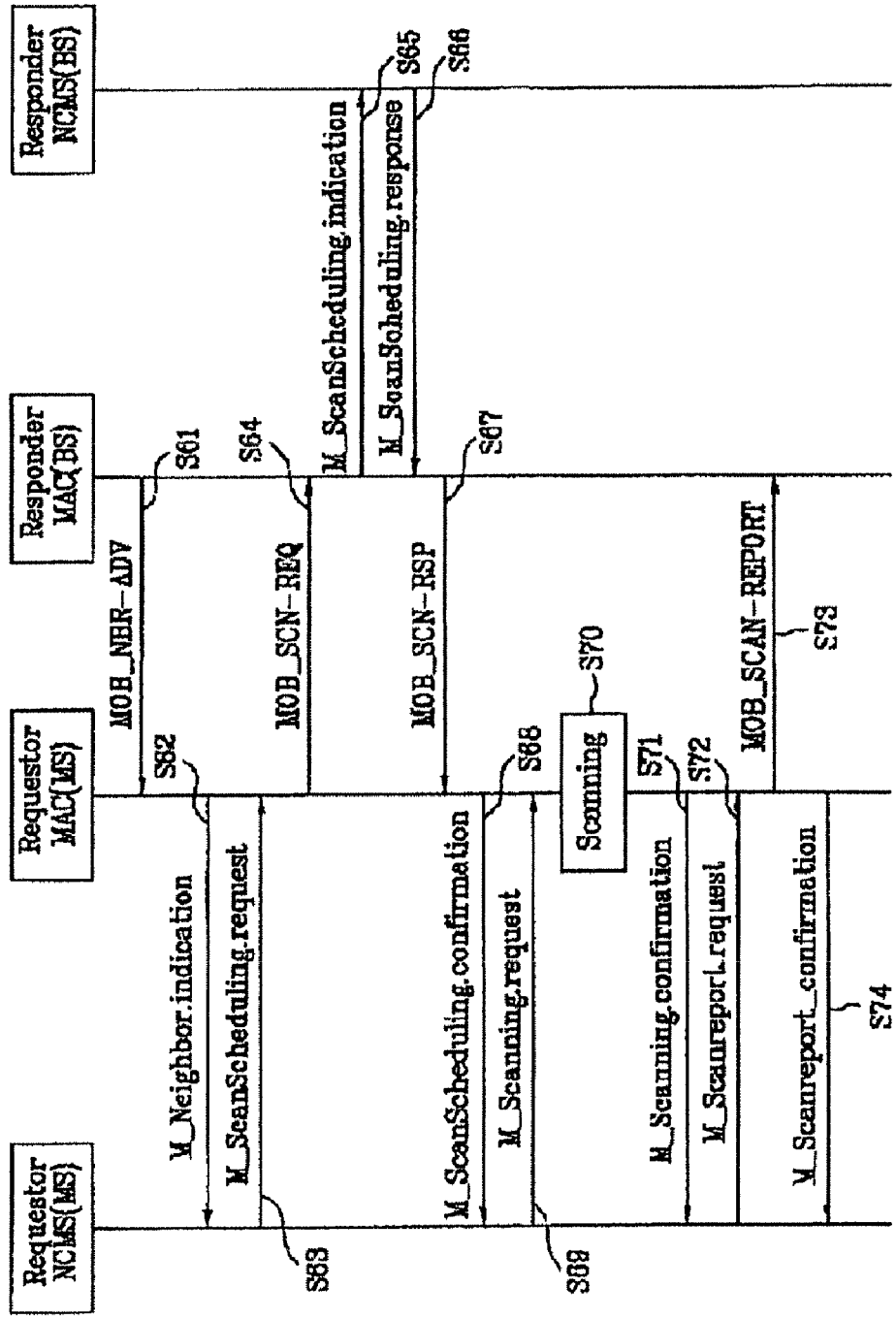
FIG. 7 depicts a flow chart of another exemplary embodiment of the present invention.

FIG. 7 depicts a flow chart of another exemplary embodiment of the present invention, wherein scanning is performed after the mobile station request scanning to the base station.

After the mobile station MAC layer receives a MOB_NBR-ADV message from the base station [S61], the information included in this message is delivered to its upper management entity through use of an M-ScanScheduling.request primitive [S63], to instruct the base station for requesting a MOB_SCN-REQ message.

The mobile station MAC layer transmits the MOB_SCN-REQ message to the base station MAC layer [S64], and the base station MAC layer delivers the contents of the MOB_SCN-REQ message to its upper management entity through use of an M_ScanScheduling.indication primitive [S65].

Here, it should be noted that the scan scheduling may include at least one factor from a group comprising: a scan duration, scan iteration, scan start frame, and interleaving interval.

The upper management entity of the base station performs scheduling for the scanning duration and start frame of the mobile station, then delivers these to the base station MAC layer through use of an M_ScanScheduling.response primitive [S66].

The base station MAC layer transmits a MOB_SCN-RSP message to the mobile station in response to the MOB_SCN-REG message [S67].

After the mobile station MAC layer receives the MOB_SCN-RSP message from the base station, this is delivered to its upper management entity through use of an M_ScanSceduling,indication primitive [S68]. The upper management entity of the mobile station delivers an M-Scanning, request primitive to instruct the mobile station MAC layer to perform scanning [S69]. After the mobile station MAC layer performs scanning [S70], the results are delivered to upper management entity of the mobile station through use of an M_Scanning.confirmation primitive [S71]. The upper management entity of the mobile station delivers an M_ScanReport.request primitive to the mobile station MAC layer [S72], and instructs a MOB_SCAN-REPORT message to be transmitted to the base station. After the mobile station MAC layer transmits the MOB_SCAN-REPORT message to the base station [S73], this is delivered to an upper management entity of the mobile station through use of an M_ScanReport.confirmation primitive [S74].

As explained with reference to FIGS. 6 and 7, the primitives transmitted through the Management SAP (M_SAP) and/or the Control SAP (C_SAP) to perform scanning by the mobile station and to request scanning from the base station will be explained in more detail hereafter.

(1) M_Neighbor.Indication Primitive

1) Function

The M_Neighbor.indication is a primitive transmitted from the mobile station MAC layer to an upper management entity through the Management SAP, to provide the information related to neighbor base stations received as a MAC management message.

2) Semantics

M_Neighbor.indication
{
Source,
Destination,
Operator ID,
N_Neighbors
Neighbor BS-ID,
HO Process Optimization,
Available Radio Resource
}

The following table shows an exemplary data format of the M_Neighbor.indication primitive.

TABLE 1

| Name | Type | Valid Range | Description |
|---|---|---|---|
| Source | | | Start point of Indication |
| Destination | | | Target point to which Indication is delivered |
| Operator ID | | | Identifier allocated to operator of base station that transmits the Indication |
| N_Neighbors | | | Total number of base station IDs included in the Notification and transmitted |
| Neighbor BS-ID | | | Base station ID |
| HO Process Optimization | | | This field includes information that can be maintained during handover of MS to corresponding BS. If corresponding bit is set to 1, this indicates information that can be continuously maintained even upon handover to corresponding BS.<br>Bit #0: SBC-REQ/RSP message<br>Bit #1: PKM-REQ/RSP message<br>Bit #2: REG-REQ/RSP message<br>Bit #3: IP Address<br>Bit #4: Time of Day Acquisition message<br>Bit #5: TFTF message<br>Bit #6: Information related to all services and operations |
| Available Radio Resource | | | Percentage of sub-channels and symbol resources that may be used for each frame of a corresponding BS.<br>0b0000: 0%<br>0b0001: 20%<br>0b0010: 40%<br>0b0011: 60%<br>0b0100: 80%<br>0b0101: 100%<br>0b0110~1110: Reserved bits |

3) Time of Formation

The M_Neighbor.indication primitive is formed by the mobile station MAC layer after receiving a MOB_NBR-ADV message from the base station for delivering the essential information included in the message to an upper management entity.

4) Effect when Received

The upper management entity receives the M_Neighbor.indication primitive from the mobile station MAC layer to obtain information related to the neighbor base stations.

(2) M_ScanScheduling.Request Primitive

1) Function

The M_ScanScheduling.request is a primitive from the upper management entity to the mobile station MAC layer that instructs a MBO_SCN-REQ message to be transmitted to the base station for the purpose of scanning.

2) Semantics

```
M_ScanScheduling.request
{
Source,
Destination,
Scan duration,
BS-ID
}
```

The following Table shows an exemplary data format of the M_ScanScheduling.request primitive.

TABLE 2

| Name | Type | Valid Range | Description |
| --- | --- | --- | --- |
| Source | | | Start point of Request |
| Destination | | | Target point to which Request is delivered |
| Scan duration | | | Duration when MS performs scanning |
| BS-ID | | | After MS receives this primitive, the ID of the BS to which SCN-REQ is to be sent |

3) Time of Formation

The M_ScanScheduling.request primitive is formed such that the upper management entity of the mobile station instructs mobile station MAC layer to transmit a MOB_SCN-REQ message to the base station.

4) Effect when Received

After the mobile station MAC layer receives the M_ScanScheduling.request primitive, a MOB_SCN-REQ message is transmitted to the base station.

(3) M_ScanSceduling.Indication Primitive

1) Function

The M_ScanScheduling.indication is a primitive used by the base station MAC layer to deliver to the upper management entity of the base station, the information related to the MOB_SCN-REQ message received from the mobile station.

2) Semantics

```
M_ScanScheduling.indication
{
Source,
Destination,
MS MAC Address,
Scan duration
}
```

The following Table shows an exemplary data format of the M_ScanScheduling.indication primitive.

TABLE 3

| Name | Type | Valid Range | Description |
| --- | --- | --- | --- |
| Source | | | Start point of Indication |
| Destination | | | Target point to which Indication is delivered |
| MS MAC Address | | | MAC address of MS that requested scan |
| Scan duration | | | Duration of scan requested by MS |

3) Time of Formation

The M_ScanScheduling.indication primitive is formed after the base station MAC layer receives a MOB_SCN-REQ message from the mobile station, in order to deliver the corresponding information to its upper management entity.

4) Effect when Received

After receiving the M_ScanScheduling.indication primitive, it is determined whether to allow or refuse the scanning request of the mobile station.

(4) M_ScanScheduling.Response Primitive

1) Function

The M_ScanScheduling.response is a primitive for the upper management entity of the base station to deliver the results of the mobile station scanning request to its MAC layer.

2) Semantics

```
M_ScanScheduling.response
{
Source,
Destination,
MS MAC Address,
Scan duration,
Start frame
}
```

The following Table shows an exemplary data format of the M_ScanScheduling.response primitive.

TABLE 4

| Name | Type | Valid Range | Description |
| --- | --- | --- | --- |
| Source | | | Start point of Response |
| Destination | | | Target point to which Response is delivered |
| MS MAC Address | | | MAC address of MS that requested scan |
| Scan duration | | | Duration of scan allowed for MS |
| Start frame | | | Frame that MS may begin scan. If 0, scan begins in next frame. |

3) Time of Formation

The M_ScanScheduling.response primitive is formed after the base station upper management entity determines the results of the scan request with respect to the mobile station, in order to deliver the corresponding information to its MAC layer.

4) Effect when Received

Upon receiving this primitive, the mobile station MAC layer transmits a MOB_SCN-RSP message to the mobile station.

(5) M_ScanSceduling.Confirmation Primitive

1) Function

The M_ScanScheduling.confirmation is a primitive used by the mobile station MAC layer, after receiving the MOB_

SCN-REQ message, to deliver to its upper management entity, the information related to the received message.

2) Semantics

```
M_ScanScheduling.confirmation
{
Source,
Destination,
Scan duration,
Start frame
}
```

The following Table shows an exemplary data format of the M_ScanScheduling.confirmation primitive.

TABLE 5

| Name | Type | Valid Range | Description |
|---|---|---|---|
| Source | | | Start point of Confirmation |
| Destination | | | Target point to which Confirmation is delivered |
| Scan duration | | | Duration of scan allowed for MS |
| Start frame | | | Frame that MS may begin scan. If 0, scan begins in next frame. |

3) Time of Formation

The M_ScanScheduling.confirmation primitive is formed such that the mobile station MAC layer delivers the scan related information, received as a response from the base station, to the NCMS or management entity.

4) Effect when Received

The upper management entity of the mobile terminal may instruct scanning to the mobile station based on the information included in the delivered primitive.

(6) M_Scanning.Request Primitive

1) Function

The M_Scanning.request is a primitive used such that the upper management entity of the mobile station instructs the mobile station MAC layer to perform scanning.

2) Semantics

```
M_Scanning.request
{
Source,
Destination,
Scan duration
Link Quality Threshold
Link Status Report Period
}
```

The following Table shows an exemplary data format of the M_Scanning.request primitive.

TABLE 6

| Name | Type | Valid Range | Description |
|---|---|---|---|
| Source | | | Start point of Request |
| Destination | | | Target point to which Request is delivered |
| Scan duration | | | Duration of scan instructed to MS |
| Link Quality Threshold | | | Signal quality threshold. If signal falls below this value, a scanning report should be reported |
| Link Status Report Period | | | Period at which the scanning report should be reported |

3) Time of Formation

The M_Scanning.request primitive is formed such that the upper management entity of the mobile terminal instructs its MAC layer to perform scanning.

4) Effect when Received

The mobile station MAC layer performs scanning after receiving this primitive.

(7) M_Scanning.Confirmation Primitive

1) Function

The M_Scanning.confirmation is a primitive used by the mobile station MAC layer to deliver the results of the performed scanning to its upper management entity. The scan results may include messages that are broadcast, such as, DL-MAP, FCH or Neighbor Advertisement, through which the base station may determine whether MIH is supported or not and whether IS (Information Service) is supported or not, and if so, such information (MIH Capability, whether IS supported or not) is included. If multiple base stations are scanned and information of such multiple base stations are delivered, the information of the multiple base stations may be repeatedly included and delivered in one message, or a plurality of messages (=the total number of scanned base stations) may be delivered.

2) Semantics

```
M_Scanning.confirmation
{
Source,
Destination,
ResultCode,
BS ID,
MIH Capability,
Event Service Supported,
Command Service Supported,
IS Support,
CINR,
RSSI
}
```

The following Table shows an exemplary data format of the M_Scanning.confirmation primitive.

TABLE 7

| Name | Type | Valid Range | Description |
|---|---|---|---|
| Source | | | Start point of Confirmation |
| Destination | | | Target point to which Confirmation is delivered |
| Result Code | Enumeration | Available BS NoAvailable BS | Indicates results of performed scan. Available BS: BS that can be used is found. NoAvailable BS: BS that can be used not found. |
| BS-ID | | | Available BS as a result of scan |

TABLE 7-continued

| Name | Type | Valid Range | Description |
|---|---|---|---|
| MIH Capability | Flag | | 0: MIH not supported<br>1: MIH supported |
| Event Service Supported | | | 0: Event service not supported<br>1: Event service supported |
| Command Service Supported | | | 0: Command service not supported<br>1: Command service supported |
| IS Supported | Flag | | 0: IS not supported<br>1: IS supported |
| CINR | | | CINR value of available BS as a result of scan |
| RSSI | | | RSSI value of available BS as a result of scan |

3) Time of Formation

The M_Scanning.confirmation primitive is formed in order to deliver the results of the scan performed by the mobile station to its upper management entity.

4) Effect when Received

Upon receiving this primitive, the upper management entity of the mobile station determined handover for the available base stations.

(8) M_ScanReport.Request Primitive

1) Function

The M_ScanReport.request is a primitive used such that the upper management entity of the mobile station instructs the mobile station to report the scan results to the base station.

2) Semantics

```
M_ScanReport.request
{
Source,
Destination
}
```

The following Table shows an exemplary data format of the M_ScanReport.request primitive.

TABLE 8

| Name | Type | Valid Range | Description |
|---|---|---|---|
| Source | | | Start point of Request |
| Destination | | | Target point to which Request is delivered |

3) Time of Formation

The M-ScanReport.request is formed such that the upper management entity of the mobile station instructs the mobile station to transmit a MOB_SCAN-REPORT message to the base station.

4) Effect when Received

Upon receiving the M_ScanReport.request primitive, the mobile station MAC layer transmits a MOB_SCAN-REPORT message to the base station.

(9) M_ScanReport.Confirmation Primitive

1) Function

The M_ScanReport.confirmation is a primitive used by the mobile station MAC layer, after transmitting a MOB_SCAN-REPORT to the base station, to inform this fact to its upper management entity.

2) Semantics

```
M_ScanReport.confirmation
{
Source,
Destination,
ResultCode
}
```

The following Table shows an exemplary data format of the M_ScanReport.confirmation primitive.

TABLE 9

| Name | Type | Valid Range | Description |
|---|---|---|---|
| Source | | | Start point of Confirmation |
| Destination | | | Target point to which Confirmation is delivered |
| Result Code | | | Indicates Success, Fail with respect to Scan Report message transmission |

3) Time of Formation

The M_ScanReport.confirmation is a primitive formed such that the mobile station MAC layer, after transmitting the scan results to the base station, informs this fact to its upper management entity.

4) Effect when Received

The upper management entity of the mobile station knows that the mobile station has completed the transmission of the MOB_SCAN-REPORT message.

To implement the various features described above, the present invention can employ various types of hardware and/or software components (modules). For example, different hardware modules may contain various circuits and components necessary to perform the steps of the above method of executing scanning in a broadband wireless access system. Also, different software modules (executed by processors and/or other hardware) may contain various codes and protocols necessary to perform the steps of the present invention method.

For scanning (viewpoint of MAC), the present invention provides a method of executing scanning for a broadband wireless access system, the method comprising: receiving, from a Network Control Management System (NCMS), a first primitive that indicates a scanning request; performing scanning upon receiving the first primitive; and sending, to the NCMS, a second primitive related to the performed scanning, whereby the second primitive includes a base station identity (BS-ID). The BS-ID indicates the identities of the base stations that have been scanned. The scanning request contains a duration of the scanning. The second primitive includes a result of scanning. The result indicates whether there are any base stations that transmit radio signals. The result includes signal strength values. The signal strength values include at least one of CINR and RSSI. The result indicates whether the base station can support a media independent handover (MIH) function. The MIH function comprises at least an Information Service of MIH. The first and second primitives are delivered via at least one of a management service access point (M-SAP) and a control service access point (C-SAP). The NCMS supports a management function of a mobile station, and is a layer in an independent entity that is a management entity. The BS-ID is a 48-bit long field identifying the base station, the BS-ID is programmable, and the most significant 24 bits is used as an operator identity.

For neighbor indication (viewpoint of MS MAC), the method may further comprise: receiving, from a base station medium access control (MAC) layer, a neighbor advertisement message; and sending, to the NCMS, a primitive related to neighbor indication that includes at least one parameter of a group comprising, an operator ID, current BS MIH capability, current BS information service (IS) support, number of neighbors, neighbor BS ID, neighbor BS MIH capability, neighbor BS IS support, HO process optimization, available radio resources, and MIH information bit map. The MIH information bit map includes heterogeneous network information. The heterogeneous network information indicates whether the heterogeneous network is MIH capable or not.

For scanning (viewpoint of MIH), the present invention provides a method of executing scanning for a broadband wireless access system, the method comprising: sending, to a Network Control Management System (NCMS), a first primitive that indicates a scanning request; and receiving, from the NCMS, a second primitive related to a performed scanning, whereby the second primitive includes a base station identity (BS-ID). The BS-ID indicates the identities of the base stations that have been scanned. The scanning request contains a duration of the scanning. The second primitive includes a result of scanning. The result indicates whether there are any base stations that transmit radio signals. The result includes signal strength values. The signal strength values include at least one of CINR and RSSI. The result indicates whether the base station can support a media independent handover (MIH) function. The MIH function comprises at least an Information Service of MIH. The first and second primitives are delivered via at least one of a management service access point (M-SAP) and a control service access point (C-SAP). The NCMS supports a management function of a mobile station, and is a layer in an independent entity that is a management entity. The BS-ID is a 48-bit long field identifying the base station, the BS-ID is programmable, and the most significant 24 bits is used as an operator identity.

For neighbor indication (viewpoint of MIH), the method may further comprise: receiving, from the NCMS that received a primitive for neighbor indication from a mobile station medium access control (MAC) layer that received a neighbor advertisement message from a base station, a primitive related to neighbor indication that includes at least one parameter of a group comprising, an operator ID, current BS MIH capability, current BS information service (IS) support, number of neighbors, neighbor BS ID, neighbor BS MIH capability, neighbor BS IS support, HO process optimization, available radio resources, and MIH information bit map. The MIH information bit map includes heterogeneous network information. The heterogeneous network information indicates whether the heterogeneous network is MIH capable or not. The method may further comprise: establishing a unified interface to an upper layer of the mobile station for managing messages to and from at least one of a homogeneous network and a heterogeneous network.

For scan scheduling (viewpoint of MS MAC), the present invention provides a method of scan scheduling for a broadband wireless access system, the method comprising: receiving, from a Network Control Management System (NCMS), a first primitive that indicates a scan scheduling request; transmitting a scanning request containing scan scheduling information to a base station medium access control (MAC) layer; receiving a scanning response from the base station MAC layer; and sending, to the NCMS, a second primitive that indicates a result of the performed scan scheduling. The scan scheduling of the first primitive comprises at least one of a scan duration, scan iteration, scan start frame, and interleaving interval. The scan scheduling of the second primitive comprises at least one of a scan duration, scan iteration, scan start frame, and interleaving interval.

For neighbor indication (viewpoint of MS MAC), the method may further comprise: receiving, from a mobile station NCMS that received a primitive for neighbor indication from a mobile station medium access control (MAC) layer that received a neighbor advertisement message from a base station, a primitive related to neighbor indication that includes at least one parameter of a group comprising, an operator ID, current BS MIH capability, current BS information service (IS) support, number of neighbors, neighbor BS ID, neighbor BS MIH capability, neighbor BS IS support, HO process optimization, available radio resources, and MIH information bit map. The MIH information bit map includes heterogeneous network information. The heterogeneous network information indicates whether the heterogeneous network is MIH capable or not.

For scan scheduling (viewpoint of BS MAC), the present invention provides a method of scan scheduling for a broadband wireless access system, the method comprising: receiving a scanning request containing scan scheduling information from a mobile station medium access control (MAC) layer; sending, to a base station Network Control Management System (NCMS), a first primitive that indicates a scan scheduling request has been received; receiving, from the base station NCMS, a second primitive that indicates a scan scheduling has been performed; and transmitting a scanning response to the mobile station MAC layer. The scan scheduling of the first primitive comprises at least one of a scan duration, scan iteration, scan start frame, and interleaving interval. The scan scheduling of the second primitive comprises at least one of a scan duration, scan iteration, scan start frame, and interleaving interval.

For neighbor indication (viewpoint of BS MAC), the method may further comprise: sending, to a mobile station medium access control (MAC) layer, a neighbor advertisement message, to allow the MS MAC layer to send to a MS NCMS, a primitive related to neighbor indication that includes at least one parameter of a group comprising, an operator ID, current BS MIH capability, current BS information service (IS) support, number of neighbors, neighbor BS ID, neighbor BS MIH capability, neighbor BS IS support, HO process optimization, available radio resources, and MIH information bit map. The MIH information bit map includes heterogeneous network information. The heterogeneous network information indicates whether the heterogeneous network is MIH capable or not.

For scan scheduling (viewpoint of MIH), the present invention provides a method of scan scheduling for a broadband wireless access system, the method comprising: sending, to an NCMS, a first primitive that indicates a scan scheduling request; and receiving, from the NCMS, a second primitive that indicates a result of a performed scan scheduling. The scan scheduling comprises at least one of a scan duration, scan iteration, scan start frame, and interleaving interval. The first and second primitives are sent and received via at least one of a management service access point (M-SAP) and a control service access point (C-SAP).

For neighbor indication (viewpoint of MIH), the method may further comprise: receiving, from the NCMS that received a primitive for neighbor indication from a mobile station medium access control (MAC) layer that received a neighbor advertisement message from a base station, a primitive related to neighbor indication that includes at least one parameter of a group comprising, an operator ID, current BS MIH capability, current BS information service (IS) support, number of neighbors, neighbor BS ID, neighbor BS MIH capability, neighbor BS IS support, HO process optimization, available radio resources, and MIH information bit map. The MIH information bit map includes heterogeneous network information. The heterogeneous network information indicates whether the heterogeneous network is MIH capable or not. The method may further comprise: establishing a unified interface to an upper layer of the base station for managing messages to and from at least one of a homogeneous network and a heterogeneous network.

For scan reporting (viewpoint of MS MAC), the present invention provides a method of scan reporting for a broadband wireless access system, the method comprising: performing a scanning procedure; receiving, from a mobile station Network Control Management System (NCMS), a first primitive indicating a scan report request; transmitting a scan report to a base station; and sending, to the mobile station NCMS, a second primitive indicating a scan report confirmation that includes a result of transmitting the scan report to the base station. The result indicates whether there are any base stations that transmit radio signals. The result includes signal strength values. The signal strength values include at least one of CINR and RSSI. The result indicates whether the base station can support a media independent handover (MIH) function. The MIH function comprises at least an Information Service of MIH.

For scan reporting (viewpoint of MIH), the present invention provides a method of scan reporting for a broadband wireless access system, the method comprising: sending, to a Network Control Management System (NCMS), a first primitive indicating a scan report request; and receiving, from the NCMS, a second primitive indicating a scan report confirmation that includes a result of transmitting the scan report to the base station. The result indicates whether there are any base stations that transmit radio signals. The result includes signal strength values. The signal strength values include at least one of CINR and RSSI. The result indicates whether the base station can support a media independent handover (MIH) function. The MIH function comprises at least an Information Service of MIH. The first and second primitives are delivered via at least one of a management service access point (M-SAP) and a control service access point (C-SAP). The method may further comprise: establishing a unified interface to an upper layer of the mobile station for managing messages to and from at least one of a homogeneous network and a heterogeneous network.

For the SAPs, the present invention provides a protocol architecture for a broadband wireless access system, comprising: a protocol stack comprising a data and control plane and a management plane; a network control management system (NCMS) in communication with the protocol stack; a management service access point (M-SAP) and a control service access point (C-SAP) located between the protocol stack and the NCMS to allow primitives to be sent and received therebetween; and a media independent handover (MIH) layer located above the protocol stack and the NCMS to allow primitives to be sent and received therebetween via one or more MIH service access points.

For the primitives stored in the MS, the present invention provides a mobile station comprising: a protocol stack comprising a data and control plane and a management plane; a network control management system (NCMS) in communication with the protocol stack; a memory having a plurality of primitives stored therein and defined to carry information between the protocol stack and the NCMS, the information related to a method of executing scanning for a broadband wireless access system; and a processor cooperating with the protocol stack, the NCMS, and the memory to perform the method of executing scanning for a broadband wireless access system by using the primitives. The mobile station may further comprise: an upper management entity located above the protocol stack and the NCMS to allow primitives defined to carry information between the upper management entity and the protocol stack, the NCMS, or both, the information related to supporting media independent handover.

For the primitives stored in the BS, the present invention provides a base station comprising: a protocol stack comprising a data and control plane and a management plane; a network control management system (NCMS) in communication with the protocol stack; a memory having a plurality of primitives stored therein and defined to carry information between the protocol stack and the NCMS, the information related to a method of executing scanning for a broadband wireless access system; and a processor cooperating with the protocol stack, the NCMS, and the memory to perform the method of executing scanning for a broadband wireless access system by using the primitives. The base station may further comprise: an upper management entity located above the protocol stack and the NCMS to allow primitives defined to carry information between the upper management entity and the protocol stack, the NCMS, or both, the information related to supporting media independent handover.

As for the results of the present invention, when the mobile station performs scanning by using the primitives defined according to the present invention, accurate operations within the protocol stack layers can be achieved. Accordingly, Media Independent Handover (MIH) procedures can be achieved because the NCMS and MIH layer can communicate in a direct or indirect manner through use of the primitives.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of executing scanning in a mobile station for a broadband wireless access system, the method comprising:
   receiving a first primitive from a Network Control Management System (NCMS) of the mobile station, wherein the first primitive is generated when the NCMS decides to perform scanning;
   performing a scanning procedure; and
   sending a second primitive to the NCMS of the mobile station, wherein the second primitive includes information comprising a media independent handover (MIH) capability to indicate if an MIH function is supported.

2. The method of claim 1, wherein the information comprises a result code.

3. The method of claim 1, wherein the information comprises at least CINR or RSSI.

4. The method of claim 1, wherein the first and second primitives are delivered via at least a management service access point (M-SAP) or a control service access point (C-SAP).

5. The method of claim 1, wherein the NCMS supports a management function of the mobile station and is a layer in an independent entity that is a management entity.

6. An apparatus for executing scanning at a mobile station for a broadband wireless access system, the apparatus comprising:
- a Network Control Management System (NCMS) configured to perform operations related to network control and management;
- a protocol stack configured to include a layer or entity that cooperates with the NCMS; and
- a processor configured to cooperate with the NCMS and the protocol stack in order to execute protocol commands with respect to the NCMS and the protocol stack, wherein, under control of the processor, the layer or entity of the protocol stack receives a first primitive from the NCMS, wherein the first primitive is generated by the NCMS when the NCMS decides to perform scanning, wherein, under control of the processor, the layer or entity of the protocol stack further performs a scanning procedure and sends a second primitive to the NCMS of the mobile station, and wherein the second primitive includes information comprising a media independent handover (MIH) capability to indicate if an MIH function is supported.

7. The apparatus of claim 6, wherein the information includes a result code.

8. The apparatus of claim 6, wherein the information includes at least CINR or RSSI.

9. The apparatus of claim 6, wherein the first and second primitives are delivered via at least a management service access point (M-SAP) or a control service access point (C-SAP).

10. The apparatus of claim 6, wherein the NCMS supports a management function of the mobile station and is a layer in an independent entity that is a management entity.

* * * * *